United States Patent [19]

Irby

[11] 4,303,281

[45] Dec. 1, 1981

[54] MAGNETIC BALL THRUST BEARING

[76] Inventor: Holcomb B. Irby, 1204 Kentwood Dr., Mountain Home, Ark. 72653

[21] Appl. No.: 68,660

[22] Filed: Aug. 22, 1979

Related U.S. Application Data

[63] Continuation-in-part of Ser. No. 799,541, May 23, 1977, Pat. No. 4,166,488.

[51] Int. Cl.³ .................... F16C 32/04; F16C 19/10; F16C 17/04
[52] U.S. Cl. .................................... 308/10; 308/139; 308/230
[58] Field of Search ................. 308/10, 139, 159, 219, 308/229, 230

[56] References Cited

U.S. PATENT DOCUMENTS

| | | | |
|---|---|---|---|
| 2,651,550 | 9/1953 | Sharp | 308/10 |
| 3,011,842 | 12/1961 | Norris | 308/10 |
| 3,016,274 | 1/1962 | Norris | 308/10 |
| 3,663,075 | 5/1972 | Kronenberg | 308/10 |
| 3,934,950 | 1/1976 | Kuhlman | 308/10 |
| 4,036,565 | 7/1977 | Becker | 308/10 |
| 4,043,616 | 8/1977 | Zimmer | 308/10 |

FOREIGN PATENT DOCUMENTS

| | | | |
|---|---|---|---|
| 541858 | 1/1932 | Fed. Rep. of Germany | 308/159 |
| 903866 | 5/1943 | France | 308/159 |
| 580896 | 9/1946 | United Kingdom | 308/10 |

*Primary Examiner*—Richard R. Stearns
*Attorney, Agent, or Firm*—Robert R. Keegan

[57] ABSTRACT

There is disclosed a variety of magnetic ball thrust bearings in use in low friction applications such as anemometers, drills or the like wherein a permanent magnet or other source of magnetomotive force produces a magnetic flux in a closed path which passes through each ball of the ball bearing and attracts the balls and races together. In some embodiments the magnetic flux is also relied upon to produce mutual repulsion between the balls of the bearing thus serving as a magnetic ball cage. In addition to multiple ball and double race bearings, there are disclosed single ball and double socket, fixed ball and single socket, sharpened pivot and socket, and multiple roller; wherein magnetic flux is directed from a rotating shaft into the stationary member through the bearing surfaces and a path of return is provided through a magnetic shunt, a collar bearing, or some combination thereof.

21 Claims, 17 Drawing Figures

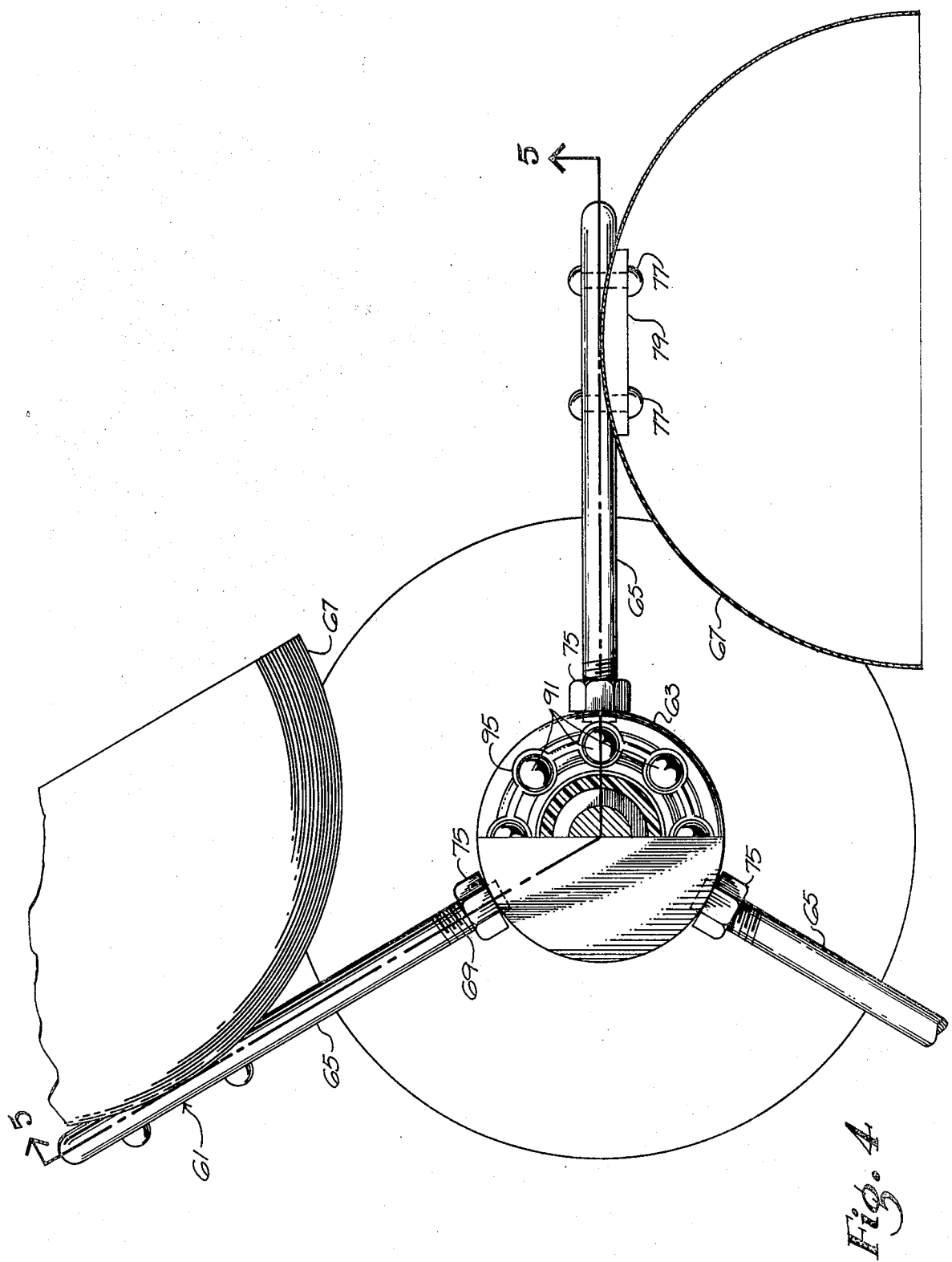

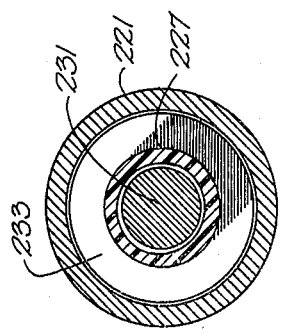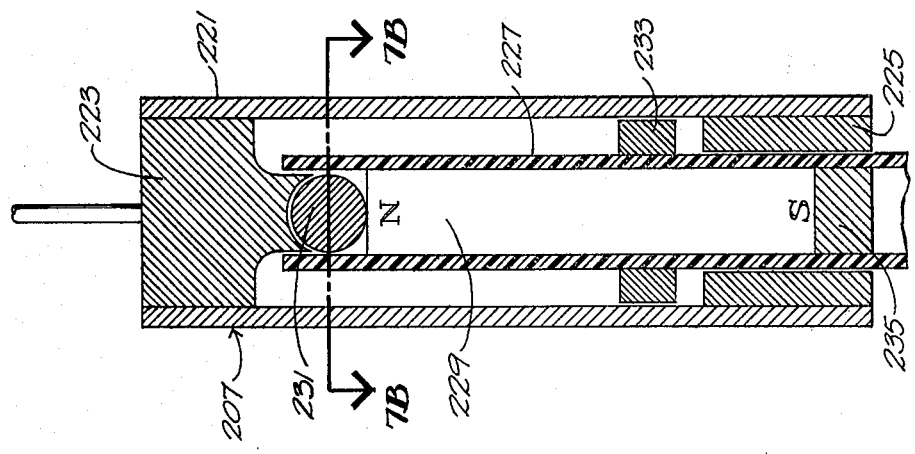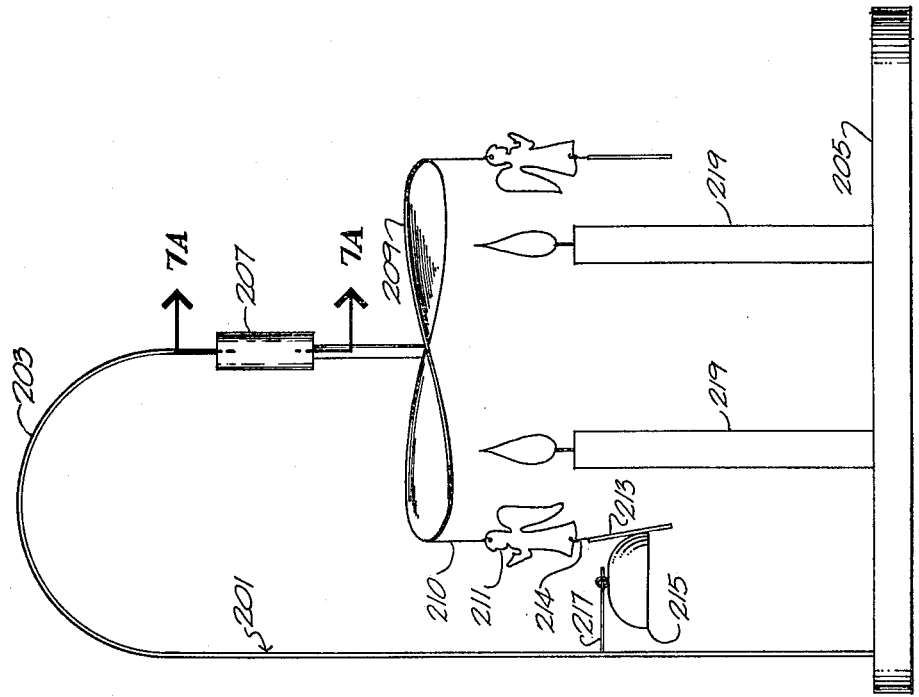

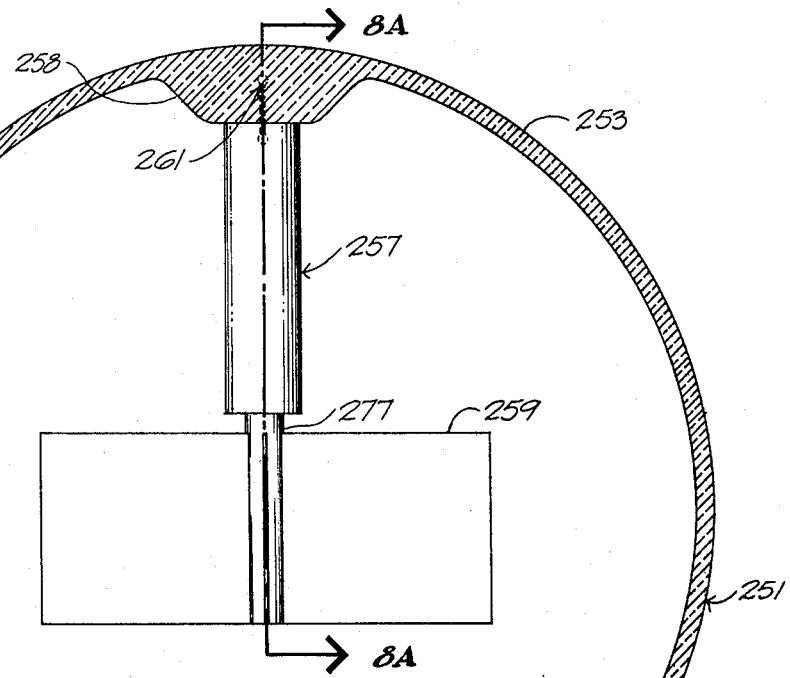
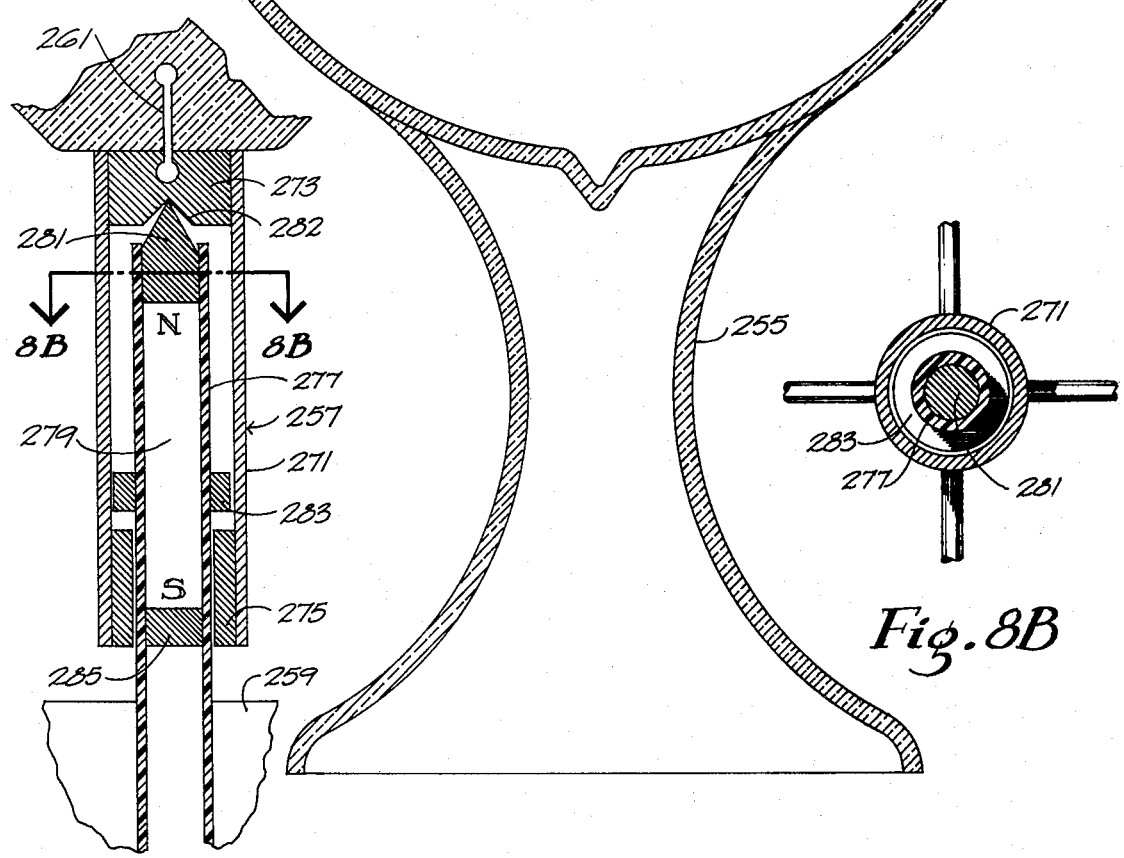
Fig. 8A  Fig. 8  Fig. 8B

MAGNETIC BALL THRUST BEARING

This application is a continuation-in-part of my prior co-pending application, Ser. No. 799,541 now U.S. Pat. No. 4,166,488, filed May 23, 1977, for TWIRL QUILL DRILL.

The present invention relates to ball, roller or pivot thrust bearings including a magnet which provides force to urge the bearing components together.

The use of balls or rollers in various kinds of bearings to eliminate sliding friction in favor of rolling friction is well known. The use of balls or rollers is known in thrust bearings as well as other types of bearings. The bearing according to the present invention differs from previous ball thrust bearings in that a magnet is provided which urges the bearing components together in the same direction that the thrust force is directed. In most cases the bearing is utilized to reduce rotating friction resulting from an additional thrust force beyond that created by the magnetic forces. An example would be a hand drill in which the rotating shaft is provided with a ball thrust bearing against which the force transmitted from the rotating tool pressure against the work piece is transmitted. In some cases the thrust force on the bearing will be essentially only that produced by the magnetic forces as in the case of the anemometer described and illustrated hereinafter.

The essential feature of the bearing is that a magnetic flux is directed axially from the rotating shaft into the stationary member through the bearing surfaces. The stationary member, or frame, then conducts the flux back alongside the shaft to some area where it re-enters the shaft. This path of re-entry may be through a magnetic shunt, a collar bearing or a combination thereof. The magnetomotive force may be provided by either a permanent magnet or an electromagnet, or both, and may be located in the rotating shaft or the stationary member, or both. The action of the flux on the rotating and stationary parts is to pull them firmly together.

The bearing may be any of the forms now in use, but has the restriction that magnetic materials must be brought to touch or nearly so. This rules out an all plastic bearing or one employing thick pads of bronze, babbitt metal, plastic, liquid or air. The types of bearings believed to be most suited are the sharpened pivot and socket, the fixed ball and socket, the free ball and double socket, the multiple ball single or double race and the multiple pin roller and double race.

One very useful aspect of the magnetic ball thrust bearing is that it eliminates lost motion in the thrust bearing mechanism. For example a hand drill, either powered or unpowered, with a conventional thrust bearing will often be noted to have lost motion or play in the shaft in the axial direction which might typically amount to at least 1/32 or 1/64 of an inch. When the drill is actually drilling the shaft is, of course, pressed into the thrust bearing and this play or lost motion is not a factor. However, when the drill bit is first placed against the work the play or lost motion must be taken up before the force is fully applied to the point of the bit. Normal procedure is to have the drill bit rotating when the point is placed at the desired position at the work piece and the play or lost motion tends to cause the bit to be displaced from the position at which it first touches the work piece. This problem is sometimes attacked by punching a mark at the center of the hole to be drilled. The present invention eliminates the troublesome play in the bearing so the bit can be firmly and forcefully positioned. It also provides a very low friction thrust bearing.

Another advantage of the magnetic thrust bearing is that it may serve to latch the rotating member in place yet permit the member to be removed with ease. This is illustrated in the twirl quill drills of FIGS. 1, 2 and 3. It may also serve as a latch for an axially slidable shaft in a gear shift mechanism as illustrated in FIG. 10.

In some cases the magnetic ball thrust bearing may be arranged so that the magnetic forces are essentially the only forces creating friction in the bearing. The magnetic forces are low and the coefficient of friction of the bearing is also low so that very low friction rotating apparatus is provided. Such an arrangement is illustrated for example in FIGS. 4–6 where anemometer apparatus is illustrated with a magnetic suspension type bearing. The magnetic force may be determined to be only slightly greater than the weight of the anemometer vanes, and only the slight difference between the gravitational force on the vanes and the magnetic suspension force represents the friction producing force.

While the apparatus of the invention is customarily referred to as a magnetic ball thrust bearing, equivalent bearings may be designed with roller elements or a fixed pivot of either rounded or pointed configuration. Also it should be noted that while most usages of the invention will be better suited for a permanent magnet to supply the magnetic flux, an electromagnet, or any other magnetic flux sources may be used where appropriate.

Prior art thrust bearings utilizing a ball element are known as shown in U.S. Pat. No. 2,183,678 to Herman, or No. 2,216,726 to Anderson. It is also known to oppose axial forces in a bearing apparatus by magnetic force as in U.S. Pat. No. 3,476,449 to Chaboseau, et. al., and U.S. Pat. No. 3,614,180 to Beer. Those prior devices do not, however, employ the force of magnetic flux through a ball thrust bearing to hold the elements in contact. Magnetic forces have also been employed for lateral rather than axial support as shown in U.S. Pat. No. 3,747,998 to Klein et al.

None of the above mentioned devices or other known devices recognize the desirability and efficacy of utilizing a magnetic flux directed through the ball of a ball thrust bearing to produce a force urging the elements together.

In addition to providing the above described features and advantages it is an object of the present invention to provide a magnetic thrust bearing apparatus including a permanent magnet and magnetic material causing a strong magnetic flux to flow axially through the thrust bearing.

It is another object of the invention to provide such apparatus with a substantially closed path of magnetically permeable material except for small air gaps for necessary clearance of moving parts.

It is another object of the present invention to provide a low friction bearing and support for a light weight rotor including a ball thrust bearing, a permanent magnet and magnetic material arranged to provide a substantially closed flux path which includes the ball of said bearing and causes a magnetic force sufficient to hold the rotating element of said bearing and said rotor against the ball and the stationary thrust bearing element.

It is still another object of the present invention to provide a thrust bearing in a hand drill for fine work in which the drill bits or other tools are mounted in quills retained in position by magnetic attraction against a ball bearing in the drill handle.

Other objects and advantages will be apparent from consideration of the following description in conjunction with the appended drawings in which:

FIG. 4 is a top plan view partially in section of an anemometer incorporating a magnetic thrust bearing according to the invention;

FIG. 7 is an elevational view partially in section of angel chimes incorporating a magnetic thrust bearing according to the invention;

FIG. 7A is an enlarged vertical sectional view of the bearing portion of the apparatus of FIG. 7;

FIG. 7B is an enlarged horizontal sectional view taken along the line 7B—7B in FIG. 7A;

FIG. 8 is an elevational view partially in section of a radiometer incorporating a magnetic thrust bearing according to the invention;

FIG. 8A is an enlarged vertical sectional view of the bearing portion of the apparatus of FIG. 8;

FIG. 8B is an enlarged horizontal sectional view taken along the line 8B—8B in FIG. 8A;

Figure 1:
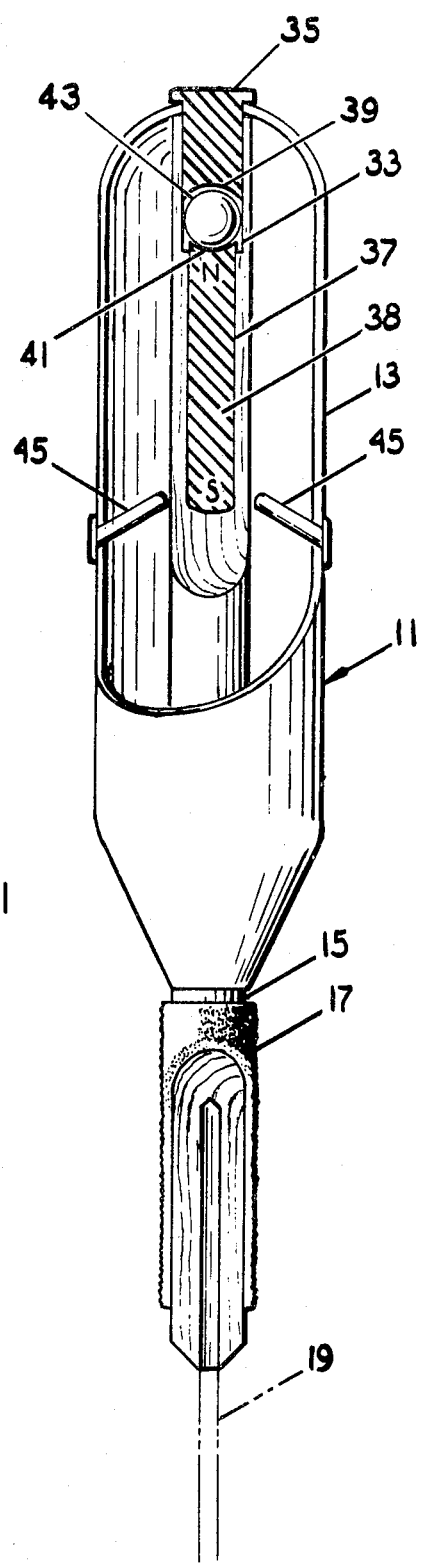
FIG. 1 is a vertical sectional view of a drill with magnetic retention and a magnetic ball thrust bearing.

Referring to FIG. 1, a simple version of a twirl quill drill according to the invention is shown at 11. Twirl quill drill 11 includes a handle 13, a quill 15 with a gripping surface 17, and an axially-mounted drill bit 19.

The top end of the quill 15 contains a bore 33 to accommodate a pin 35 in the butt end of the handle 13. In the bottom of the bore 33 there is a hole 37 of slightly smaller diameter in which is secured a permanent magnet 38 of Alnico or similar material.

Pin 35 has on the lower portion a concave generally spherical surface 39. Magnet 38 is preferably but not necessarily provided with a similar concave generally spherical surface 41. A steel ball 43 is held in bore 33 by the attraction of magnet 38. Surfaces 39 and 41 have a radius slightly greater than the radius of ball 43, and consequently, the combination of the two surfaces 39 and 41 together with the ball 43 provide an effective thrust bearing for the quill 15.

At the same time the quill 15 is prevented from dropping out of the handle 13 by the magnetic attraction of magnet 38 on pin 35.

Alignment pins 45 are provided to aid in guiding the quill bore 33 over the pin 35. In FIG. 1 pins 45 are slanted toward the butt of the handle 13 so that the end of the quill 15 will thereby be guided through the opening between pins 45.

Pins 45 are preferably made of steel and provide a further function of completing a magnetic flux path for magnet 38, through steel ball 43, through pin 35, through the case of handle 13 to the pins 45, thence to the other pole of the magnet 38. It may be noted that this path contains relatively short air gaps and thus substantially increases the flux density and the holding power of the magnet 38 for retaining the quill in the handle 13. The magnetic force retaining quill 15 and handle 13 is sufficient to support the weight of the quill against gravity and to maintain the quill in the handle during normal manipulation of the tool.

At the same time, the force is not so great as to present any difficulty in removing the quill from the handle. Bearing pin 35 and alignment pins 45 may be secured in the case of handle 13 by welding, soldering, cementing or other suitable fastening procedures.

The following steps will be taken in using the twirl quill drill. A quill with the desired size drill bit or other tool is selected by reference to a color code on the quill or other identifying marking. The end of the quill opposite the drill bit is inserted through the front opening of the handle 13. As the quill is inserted into the handle it is easily manipulated to pass between alignment pins 45 and is thus guided so that the pin 35 is guided into bore 33.

Once the quill seats in the rear bearing, the handle is grasped with the cylinder's closed end in the center of the palm of the right hand with the second, third and little fingers. At the same time the gripping surface 17 is grasped between the thumb and forefinger.

The point of the drill bit 19 is placed on the point marking the center of the hole to be drilled. This would usually have been marked in advance with a pencil or scribe crossmark. Pushing gently on the cylinder, turn the drill a few turns in the clockwise direction. The drill bit may then be lifted off the work to check the position of the center of the hold. Very fine corrections in the center hole may be made by leaning the drill and twisting it a few turns at a time. Once the center of the hole has been satisfactorily relocated, the hole may be finished by applying somewhat more force and twisting more rapidly.

The accuracy of the position and direction of the hole can be controlled remarkably well due to the simple and compact nature of the drill and the ability to hold the work close to one's eye (or place one's eye close to the work if it is clamped for drilling). In many cases the most convenient manner of operation will be to hold the work in the left hand. This ability to hand-hold the work is an outstanding advantage of the twirl quill drill, as the hand is the most sensitive and versatile holding mechanism that exists. Once the hole has been drilled with the twirl quill drill, the drill bit may be replaced with another quill containing a tap or other tool to perform further operations on the hole if desired.

From the above explanation it will be seen that the tool incorporating a bearing according to the present invention is of quite simple construction and utilizes components which are mass-produced and thus inexpensive; only comparatively simple modifications of readily available parts is required. In most cases the component could be obtained with modifications already made by the manufacturer.

The operation of the tool is simplicity itself, and the size, construction and mode of operation is inherently easy to learn and takes advantage of normal dexterity in performing holding and twisting operations.

The only injury possible with the tool is that associated with any pointed object. Normally the point of a drill bit is not sufficiently sharp to penetrate the flesh with the modest forces involved with this tool. In all likelihood, the tool is safer than a lead pencil.

The twirl quill drill, since it is quite small, will occupy very little space in a tool box and can readily be carried in a pocket. Even with a substantial collection of quills fitted with commonly used drill bits or other tools, it would occupy very little volume, substantially less than that of a power drill or even a gear-driven hand drill.

The speed with which the tool can be used is enhanced by the fact that commonly used drill bits or other tools need not be located, identified and placed in a chuck and tightened.

The very small size of the entire quill drill tool makes it most advantageous for reaching cramped quarters or drilling in places which simply could not be reached with any other drill. It is, in fact, small enough so that it would make accessible places that would otherwise require a flexible cable arrangement. While the particular quill illustrated in FIG. 1 is made quite short to minimize the overall length of the tool, one may make the quill much longer and thus achieve the effect of an extension drill.

The twirl quill drill will also be found useful, especially in very hard material, for the purpose of starting a hole with exceptional accuracy. Once the hole has been started, it may be completed with an electric power hand drill or drill press.

The heft, feel and control of the twirl quill drill permits the use of very small drill bits to produce tiny holes without the usual hazard of breaking such drills in the work. This recommends the tool for use in working with jewelry, models and similar very delicate work. Due to the low speed of the drill and the control of speed and pressure, heat-sensitive plastics may readily be drilled where melting of the plastic would gum a power drill and possibly seize and cause breaking of the work.

In delicate work it is even possible to drill with a finger of the left hand behind the piece to sense the first slight deformation of the work before the tool breaks through. Thus damage to the back surface in drilling can be completely avoided.

Holes can be drilled without a center punch thus making the tool most useful on finished articles and delicate apparatus and minimizes the drilling of the backside-mounted components of finished equipment after the punch through. Especially when the work is held in the left hand, drill chips from the work may very readily be caught in a small container and thus do not become distributed where they could damage surfaces or otherwise be a nuisance. Chips of precious metal can also thus be saved.

As there are virtually no flying chips from the tool, the work can be held as close to the eye as convenient and no bulky eye shield is necessary.

Figure 2:
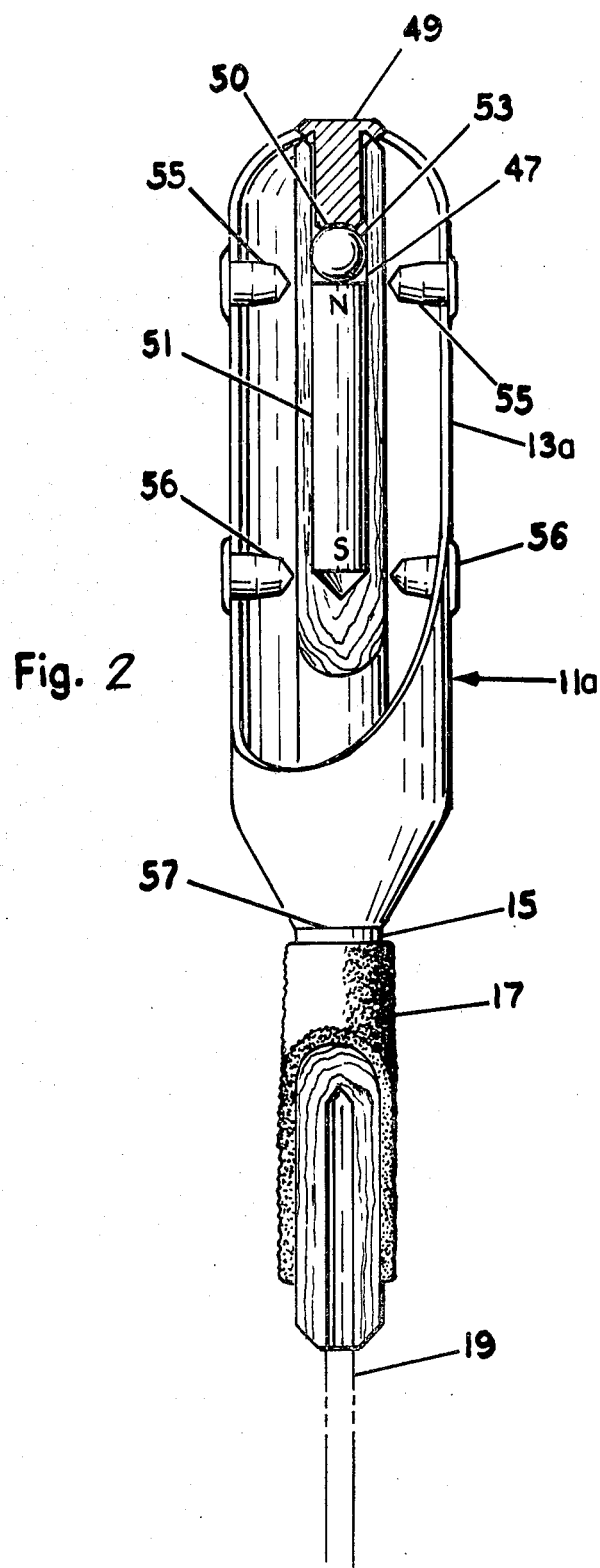
FIG. 2 is a vertical sectional view of an alternative form of drill with a magnetic ball thrust bearing and nonmagnetic alignment pins.

FIG. 2 illustrates another embodiment of the invention. In FIG. 2 the twirl quill drill 11a includes a handle 13a, a quill 15 with a gripping surface 17, and an axially mounted drill bit 19. The top end of quill 15 has an axial bore 47 extending about one-third of the length of the quill 15. The outer end of the bore 47 engages a pin 49 which extends internally from the butt end of the handle and is secured in place by soldering, welding or other suitable procedure. In FIG. 2 the bore 47 has a diameter substantially smaller than the diameter of the quill 15, thus leaving thicker and stronger walls for engagement of pin 49. For example, bore 47 may be 5/32 inch in diameter, and quill 15 may be 5/16 inch in diameter. A strong cylindrical permanent magnet 51 occupies the bottom of the bore 47 and is press fit, cemented or otherwise secured in place. The magnet 51 may be an Alnico magnet. Retained in the bore 47 by magnet 51 is a steel ball 53.

Steel ball 53 acts as a thrust bearing element to reduce the turning friction for quill 15. The end surfaces of magnet 51 are both flat and are not cupped as illustrated in FIG. 1. This shape gives satisfactory performance and permits use of standard, readily available magnets without modification. Pin 49 is shown with a slightly concave end surface 50. The radius of the surface 50 would be slightly greater than the radius of steel ball 53. The contrasting concave and flat surfaces of the pin and magnet respectively give the magnet a decided advantage in retaining the ball when quill and handle are parted. Alternatively, the end of pin 49 may be substantially flat.

The end of pin 49 is slightly tapered or chamfered, thereby facilitating the engagement of quill 15 over pin 49. The upper end of quill 15 may also be provided with an internal taper as shown in FIG. 2.

Alignment pins 55 and 56 are provided to facilitate alignment of quill 15 so as to engage pin 49; alignment pins 55 are preferably made of brass or other non-magnetic material; alignment pins 56 are preferably made of magnetic material such as steel.

In placing quill 15 into handle 13 the steel ball 53 is placed in bore 47 if it is not already in place. The top of quill 15 is then inserted in the bearing opening 57 and about one-third of the way into the handle where it must pass between alignment pins 56. Alignment pins 56 are preferably four in number spaced at 90° around the handle 13. The alignment pins 56 are tapered to facilitate passage of the end of the quill 15 therebetween. Quill 15 may also be provided with an external taper at the top end to facilitate passage between pins 56. Approximate alignment being attained by reason of pins 56 the quill end readily passes between upper alignment pins 55 and is thereby guided to engage pin 49. Upon seating of the quill 15 it is held in place by magnetic attraction of pin 49 by magnet 51 through steel ball 53; a closed path with relatively narrow air gaps is provided for magnetic flux from the South pole of magnet 51, through alignment pins 56, upward through the case of handle 13 and back through thrust pin 49 and steel ball 53 to North pole of magnet 51.

The operation of the twirl quill drill of FIG. 2 is similar to that described with respect to FIG. 1 except as noted above. The general construction and features of the twirl quill drill of FIG. 2 are also similar to the twirl quill drill of FIG. 1 except as noted above.

Figure 3:
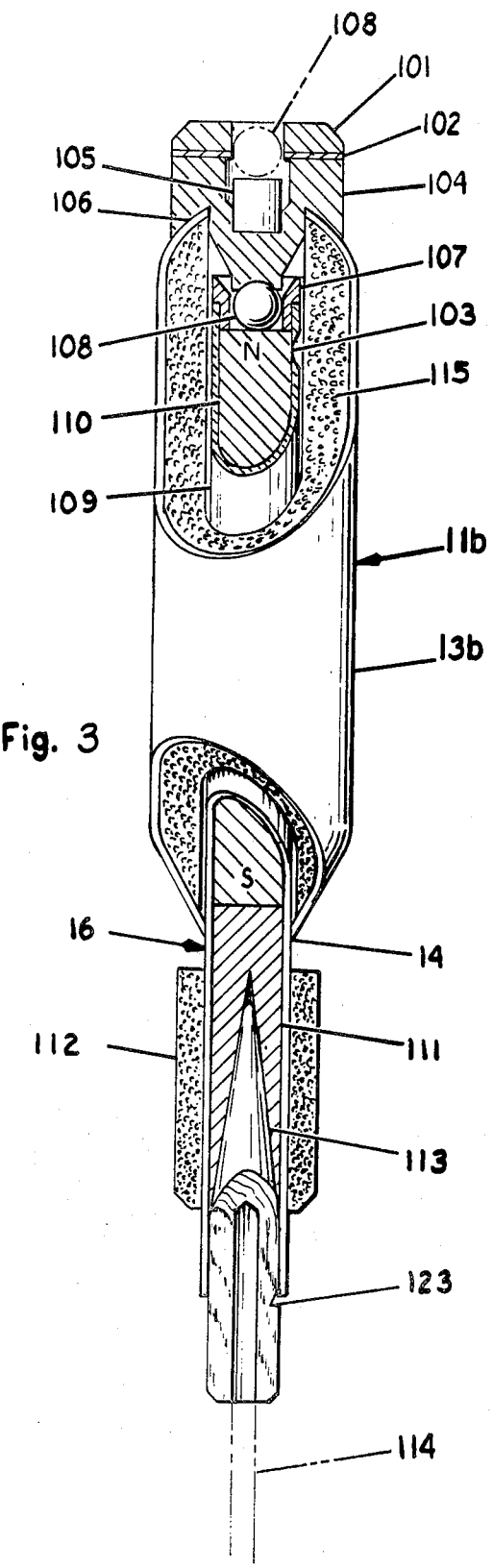
FIG. 3 is a vertical sectional view of another alternative form of magnetic ball bearing drill.

Referring to FIG. 3, a multi-featured embodiment of a twirl quill drill is shown at 11b having a handle 13b which may be formed of the same material and of the same shape as a conventional $CO_2$ cylinder; it may thus be manufactured on the same production equipment with substantially the same methods. The handle 13 has a smooth opening 14 which accepts a quill 16 and forms a front bearing for the rotation of quill 16.

At the top of quill 16 is a quill bearing element 107 which performs several functions. It aids in retaining in place a magnet 110 which is positioned between frog 111 and bearing element 107. The magnet 110 may be an Alnico V magnet with an outside diameter of 1/4 inch and a length of 1 3/4 inches with precision ground ends.

The quill bearing element 107 also acts as a cup to retain steel ball thrust bearing 108. Other functions of the quill bearing element will appear in the following explanation. The quill bearing element may have a major outside diameter of 5/16th inch, a minor outside diameter of 1/4 inch, an inside diameter of 0.18 inch and an overall length of 0.2125 inches. It is preferably machined or otherwise formed from aluminum alloy or other long-wearing non-magnetic material.

The handle 13b is surmounted by a handle bearing structure 104 which also serves as a pole piece for the magnetic retention feature to be later explained. The bearing structure has a lower surface which is spherically concave to position steel ball 108. The minor outside diameter of bearing structure 104 is the same as steel ball 108, namely 0.175 inches. Bearing structure 104 tapers to an intermediate diameter of 11/32nd inches; the taper of bearing structure 104 matches an internal taper in the top of quill 16. The top surface 106 of handle 13 is provided with an opening to accept the intermediate diameter of bearing structure 104. Bearing structure 104 may have an overall diameter of 0.65 inches. The top of bearing structure 104 is provided with a cavity to accept the steel ball 108 with a diameter of 1/4 inch. In that cavity there is secured a small magnet 105 which may be made of Alnico V with an outside diameter of 3/16th inch and a length of 0.20 inches. Magnet 105 is secured in place by cementing or otherwise, and bearing structure 104 may similarly be secured to the top surface 106 of handle 13b by epoxy cement or other suitable adhesive.

Preferably the interior of handle 13 is filled except for a void to accommodate quill 16 by a body of plastic foam 115. The inside diameter of the void in foam 115 may be approximately 11/32nd inch. The foam for foam body 115 is preferably a two-part expanding foam resin such as Craft Cast available from Edmund Scientific Company.

At the top of bearing structure 104 is a ring 102 of high-permeability magnetic material such as Hypernic. Ring 102 may be 0.028 inches thick with an outside diameter of 0.65 and an inside diameter of 0.18. Ring 102 may be secured in place by cementing with epoxy resin or other suitable adhesive.

An aluminum alloy cap 101 is secured at the top of the handle 13 and preferably has inside diameter and outside diameters corresponding to that of the ring 102. Its thickness may be approximately 0.08 inches.

In FIG. 3 bearing structure 104, ring 102 and cap 101 form a magnetic ball keeper for the ball 108 when ball 108 is not being used as a low-friction thrust bearing. The flux path retaining ball 108 in the ball keeper formed by cap 101, ring 102 and bearing structure 104 is from the upper (north) pole of magnet 105, through the ball 108 shown in dashed lines to the high-permeability material of ring 102, down through the soft iron of bearing structure 104 and back to the lower (south) pole of magnet 105.

A spherical identation 103 is provided in quill 16 near the end of magnet 110 which serves as a ball thief as later described. The overall dimension of the handle bearing structure and ball retainer secured to the top thereof is about 2 1/2 inches. While the size of the handle is subject to considerable variation, it is preferred that the overall length of the handle be equal to or somewhat less than the width of the palm of the person who is to use the tool. A dimension of 2 1/2 inches is only somewhat less than the average width of a man's palm, yet would not be substantially greater than the palm width of a woman or youth who might use the tool.

The embodiment of the tool illustrated in FIG. 3 is capable of two modes of operation. The first is the twirl mode, an operation similar to that of previously described embodiments of the too. Ball 108 (which may be a precision ground B.B. shot as manufactured by Daisy Air Rifle or others) will be in place as shown in solid lines in FIG. 3. The combination of ball 108, the face of magnet 110 and the concave surface of bearing structure 104 will perform a triple function of rear guide bearing, thrust bearing and magnetic latch. These elements should never be lubricated in any way and should be kept free of iron filings by capturing them on the sticky side of masking tape or transparent tape.

High torque mode of operation is available by removing ball 108 and storing it in the retainer formed by elements 101, 102 and 105. In the high torque mode quill bearing element 107, being without ball bearing 108, slides up to engage the conical taper of bearing element 104 and is no longer free to turn without friction. In fact this now becomes a high friction coupling, and the tool may be used as a screwdriver or other non-slip tool.

It should be noted that the ball 108 may be captured by either magnet 110 or by bearing element 104 depending on the shape of their surfaces and the resulting flux concentration at their interface with the ball. Generally the element surface with a radius of curavture nearest that of the ball will have the lesser flux concentration and will lose the ball to the other element.

Referring now to FIG. 4 an anemometer 61 is shown having a rotor 63 on which are mounted three arms 65 carrying cup shaped vanes 67. Arms 65 may be secured to rotor 63 by having threaded ends 69 engaging tapped holes (not shown) in rotor 63. Nuts 75 may be provided to serve as lock nuts for arms 65. Each vane 67 may be secured to an arm 65 by rivets 77 passing through a clamping disc 79, the back of vane 67 and arm 65.

Figure 5:
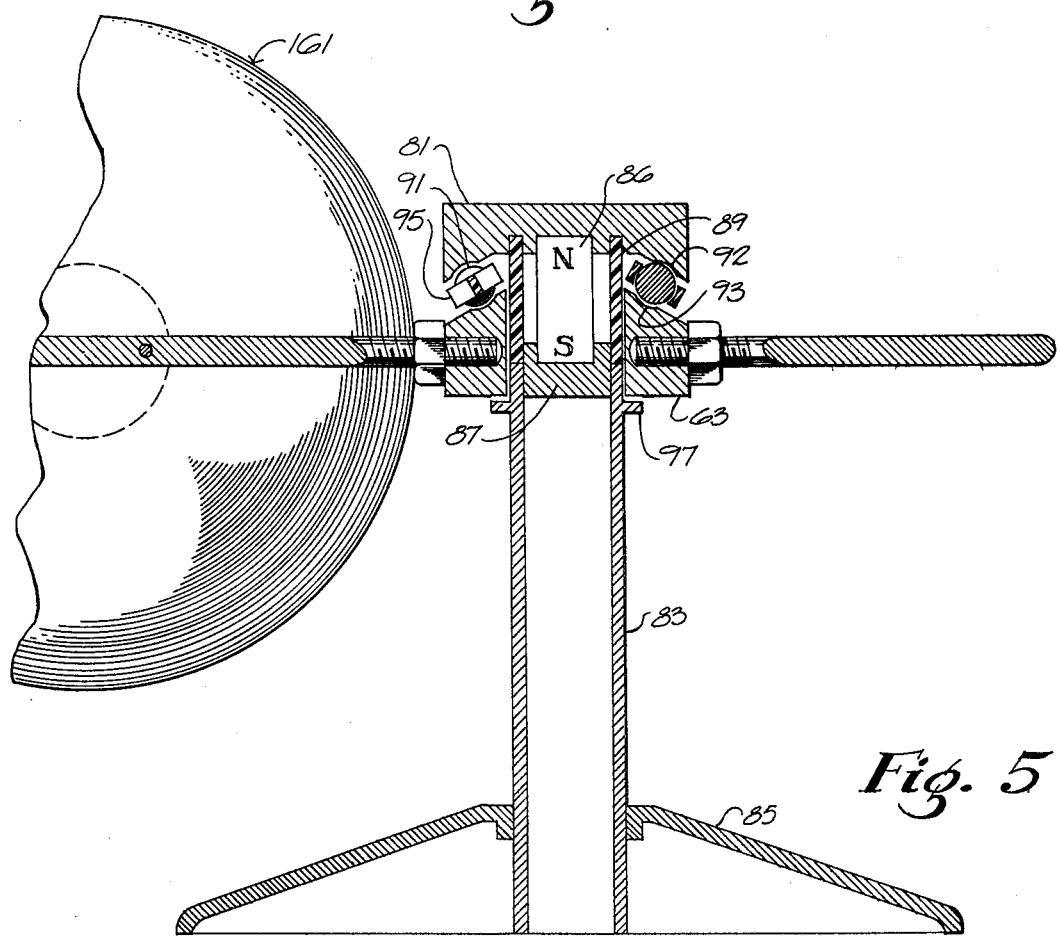
FIG. 5 is a vertical sectional view of the apparatus of FIG. 4 taken along the line 5—5 in FIG. 4.

As best shown in FIG. 5 the rotor 63 is supported by magnetic attraction to stator 81 which is mounted on hollow tube 83 that is supported by a base 85. Stator 81 also acts as a pole piece for magnet 86; the other pole piece for magnet 86 is provided by a cylinder 87 of ferro-magnetic material. The lower portion of tube 83 and particularly that portion between pole piece 87 and rotor 63 may also be of ferro-magnetic material. The upper portion 89 of tube 83 is preferably made of plastic or other non-magnetic material. The plurality of steel balls 91 are captured between stator 81 and rotor 63 in races 92 and 93 thereby forming a ball bearing structure. A conventional ball separator ring 95 of plastic or other suitable material keeps the balls from rubbing against one another. A capture ring 97 below rotor 63 assures that it cannot be separated far enough from stator 81 to diminish the magnetic force to the point where rotor 63 would no longer be urged upward to maintain contact between balls 91 and the stator 81. Cap ring 97 however is slightly spaced below rotor 63 (by 1/32 inch, for example) so that normally there is no contact between them.

Races 92 and 93 are sloped (at about 30°) to form a conical configuration thereby causing the bearing for anemometer 61 to be capable of resisting moderate lateral forces without sliding friction.

The strength of magnet 86 together with the air gap dimensions between stator and rotor and pole piece are selected to produce a magnetic force upward on rotor 63 which is more than sufficient to support the weight of rotor 63 together with the associated arms 65 and vane cups 67. Preferably the magnetic force does not exceed twice the weight of the rotating mechanisms and may be only 10 to 20 percent greater than such weight.

It will be understood from the previous description that a magnetic flux path is provided in the bearing mechanism which may be traced from the north pole of magnet 87 marked "N" through the stator 81; balls 91 into rotor 63 through the wall of 83 into pole piece 87 to the south pole of magnet 86 marked "S". There is accordingly a relative strong magnetic force across the air gaps around balls 91 causing balls 91 to be attracted to stator 81 and rotor 63 to be attracted to balls 91. Those forces however are less than the force that would be present on a conventional bearing which would necessarily be a force at least equaling the weight of the total rotating structure. By reason of the reduction of the thrust force without sacrificing any advantage of reduced rolling friction achieved by the ball bearings, a reduction of friction forces tending to resist the rotation of the rotating structure is achieved. This is particularly important in reducing the starting friction of the apparatus which determines the minimum wind velocity which can be measured. The anemometer of FIGS. 4 and 5 will, of course, be provided with a velocity sensing element which can be either magnetic or optical and will sense the velocity with negligible or no added resistive forces. The particular form of sensing element used is not material to the present invention and thus the sensing element is not shown.

It may be noted that while a conventional separator ring 95 is shown for ball bearings 91 an optional arrangement according to the invention would eliminate separator ring 95 and increase the number of ball bearings to nearly fill the periphery of races 92 and 93. The magnetic flux paths through balls 91 are such that there is a small but significant magnetic repulsion between the balls which will keep them separated without the necessity for a separator ring 95. For such configuration the balls should completely fill the races except for an average spacing between balls of from about 1/64 to about 1/16 inch.

Figure 6:
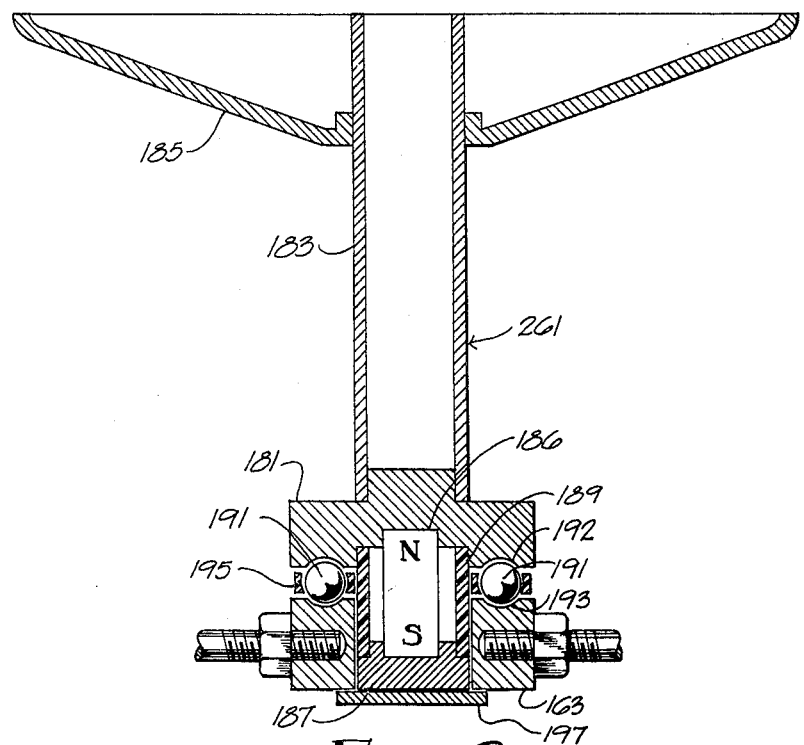
FIG. 6 is a fragmentary elevational view partially in section of an alternative form of anemometer with magnetic thrust bearing according to the invention.

An alternative magnetic ball bearing structure for an anemometer is shown in FIG. 6. The FIG. 6 embodiment differs first in the fact that it is supported from above rather than below. The anemometer 261 of FIG. 6 includes a support fixture 185, a support tube 183, a stator 181 and a rotor 163. The arms and vanes for the FIG. 6 embodiment may be identical to that shown in FIGS. 4 and 5 and hence are omitted for simplicity. The arms are oppositely disposed in FIG. 6 and may be two or four in number.

A magnet 186 is secured to stator 181 which acts as a pole piece therefor. Secured to the bottom of magnet 186 is a pole piece 187. Pole piece 187 may be secured in relation to stator 181 by tubing section 189 which should be of non-magnetic material. Stator 181, rotor 163 and pole piece 187 should of course be formed of ferro-magnetic material.

It may be noted that tubing section 189 might be omitted and magnet 186 utilized as part of the structure of the bearing. If the magnet 186 had suitable structural properties this would be acceptable but one might wish to utilize a brittle magnetic material in which case the tubing section 189 serves the structural function and no such function is required of magnet 186. The above comments are also applicable to the embodiment of FIGS. 4 and 5. The apparatus of FIG. 6 is provided with balls 191 which run in races 192 and 193 formed in stator 181 and rotor 163, respectively. A separator ring 195 is provided to maintain separation of balls 191 but such ring may be omitted as described in the discussion of FIGS. 4 and 5. A capture plate 197 prevents complete separation of rotor 163 from stator 181. It will be noted that the FIG. 6 arrangement differs from that shown in FIGS. 4 and 5 by reason of the flat races 192 and 193 provided for balls 191 in contrast to the sloped races 92 and 93 as shown in FIG. 5. Thus the FIG. 6 arrangement while being simpler may be less able to withstand lateral forces on the bearing before rotor 163 is displaced enough to contact pole piece 187 or tube 189 with resulting sliding friction.

As previously noted it is important that tube element 189, if included, be formed of non-magnetic material so that it does not short-circuit the magnetic flux path which is intended to pass through balls 191. It might be observed that since balls 91 are rolling in a magnetic field produced by magnet 86 there is a possibility of generation of electrical currents (eddy currents) in the balls and some resulting drag forces. This effect, if it exists, has been found not to be detrimental to the operation of the apparatus. Obviously such effect would not take place until the device was at substantial speed and would not affect the starting force requirement.

Except as noted above the operation of the apparatus of FIG. 6 is similar to that described in connection with FIGS. 4 and 5 and thus its operation will not be explained in further detail.

Referring now to FIG. 7 a novelty angel chimes apparatus is shown adapted to incorporate a magnetic ball bearing according to the invention. Apparatus of this general type is popular as a decorative novelty and its operation is well-known. The angel chimes apparatus 201 includes an over-hanging rod 203 secured to a base 205. A thrust bearing 207 according to the present invention provides a low friction bearing and support for a turbine or propeller blade 209. From the ends of the turbine blade 209 decorative angel figures 211 are supported by cords 210 from which are suspended metal striker rods 213 on cords 214.

The striker rods 213 are arranged to strike a bell 215 supported by an arm 217 from rod 203 as the turbine 209 rotates. Rotation of turbine 209 is produced by candles 219 producing a flow of heated air upward through turbine blades 209 and causing them to rotate. Except for the bearing 207 to be described hereafter the structure described above is generally conventional.

In the enlarged views 7A and 7B bearing 207 is shown in detail. It includes a cylindrical shell 221 of ferro-magnetic material, a flux conductor element 223 secured in the top portion of shell 221 which is also of ferro-magnetic material. The bottom of shell 221 is a ferro-magnetic bushing element 225. These three elements form the stator of the bearing 207.

The rotor for bearing 207 includes a tube 227 within which there is secured a magnet 229. The tube 227 is preferably of non-magnetic material such as plastic or aluminum.

The upper end of tube 227 extends beyond magnet 229 forming a cavity in which is located steel ball 231. Ball 231 fits loosely in the end of tube 227 and as magnet 22 is drawn upward by magnetic attraction to flux conductor element 223, ball 231 is also retained centrally in shell 221 by the curvature of the lower central part of flux conductor element 223. The radius of curvature of this lower portion of flux conductor element 223 is preferably only slightly greater than the radius of curvature of the surface of ball 231. In the event that ball 231 should be dislodged from flux conductor element 223, a guard ring 233 secured on the outside of tube 227 prevents tube 227 from becoming completely separated from shell 221. At the bottom end of magnet 229 is pole piece 235 of ferro-magnetic material. As seen in FIG. 7 the turbine 209 is mounted on the bottom end of tube 227 and causes it to rotate as turbine 209 rotates.

The magnetic force of attraction of magnet 229 and ball 231 to flux conductor element 223 is preferably only slightly greater than the weight of the turbine, the parts suspended therefrom, and the rotor element consisting of tube 227, magnet 229, ball 231, guard ring 233 and pole piece 235. Accordingly very little drag is produced in bearing element 207 because the thrust force on ball 231 is low, and the coefficient of friction, being due generally to rolling motion rather than sliding motion, is also quite low.

Thrust bearing 207 is not designed to resist lateral forces and lateral forces will cause tube 227 to bear against bushing 225. Such forces should be practically non-existant in the apparatus of FIG. 7 however so that almost unmeasurable drag resistance to rotating motion would be present. Bearing 207 may be secured in any desired fashion to support 203 as by a hook and eye, a snap bead, or permanent fastening by adhesive or the like.

An exceedingly low friction bearing according to the invention is provided as described above with the angel chime apparatus of FIG. 7. It is essentially trouble-free and requires no attention or lubrication. In fact the bearing of the invention should not be lubricated as it would be adversely affected thereby.

FIGS. 8, 8A and 8B show a different use and a modified form of magnetic thrust bearing according to the invention. The radiometer illustrated in FIG. 8 is generally conventional except for the magnetic thrust bearing and suspension provided for the radiometer vanes.

Radiometer 251 includes a generally spherical partially evacuated bulb 253 on a base 255 both of which may be formed of glass or plastic. Bulb 253 has a thickened wall portion 258 at the top thereof to which is fastened thrust bearing 257 by a snap bead fastener 261 or other suitable means. The rotor of bearing 257 includes a support tube 277 to which are attached vanes 259. The operation of a radiometer is well known and will not be explained in detail. It will suffice to say that vanes 259 are silvered or otherwise rendered highly reflective on one side and on the other side are blackened and absorptive of visible and infrared radiation. The molecules of the rarified gas in a chamber rebounding from the hotter absorptive surface produce a greater force than on a reflective surface causing the radiometer vanes to turn.

The forces involved in the radiometer for moderate light levels are very small indeed, and thus for the radiometer to be most sensitive it is desired to have a very low friction bearing. A modification of the magnetic thrust bearing according to the invention provides a simple and inexpensive low friction bearing for a radiometer as may be seen in enlarged views of 8A and 8B.

Bearing 257 includes a shell 271 formed of ferro-magnetic material with the top opening thereof closed by a magnetic flux conductor element 273. At the bottom of shell 271 is a bushing element 275 which is formed of ferro-magnetic material as is magnetic flux conductor 273.

Centrally located in shell 271 is a tube 277 formed of non-magnetic material such as plastic or aluminum. With tube 277 is mounted a permanent magnet 279 of Alnico V or other suitable permanent magnet material. In the top end of tube 271 a sharpened pivot element 281 is secured by press fitting, adhesive or otherwise; it is also of ferro-magnetic material. Flux conductor element 273 has a conical indentation 282 in its lower surface in which is located the point of pivot element 281 retained whereby the magnetic force of the flux produced by magnet 279.

A guard ring 283 is provided which encircles tube 277 and by reason of the interference with bushing 275 prevents tube 277 from becoming separated from shell 271 should pivot 281 be dislodged from its seat in depression 282. A pole piece 285 is located within tube 271 at the lower end (South pole) of magnet 279. The pole piece 285 and its counterpart 235 in FIG. 7 is not essential and may in some cases be omitted.

As in FIG. 7 and previously described embodiments of the bearing according to the invention, the magnetic thrust bearing in FIGS. 8A and 8B has anti-friction components which are held in contact by magnetic forces produced by an integral permanent magnet. The holding forces are enhanced by a flux conductor element and other ferro-magnetic material components of the bearing which provide a closed flux path except for small gaps necessary to provide clearance for rotating parts. As a result the requirement for the permanent magnet strength is reduced and a small and inexpensive permanent magnet can readily supply the necessary magnetic flux for the apparatus.

In general the operation of the bearing illustrated in FIGS. 8A and 8B is similar to that of previously described bearings although it is a pivot bearing rather than a ball bearing. The pivot bearing construction is thought to be potentially advantageous and possibly less expensive for certain applications particularly where rather high speed rotational motion on the order of thousands of revolutions per minute may be involved. At the same time the bearing 257 of FIGS. 8, 8A and 8B provides a bearing with exceptionally low starting friction thus permitting the radiometer 251 to be used in demonstrations of heat or light detection of very weak sources such as a match or glowing cigarette.

Figure 9:
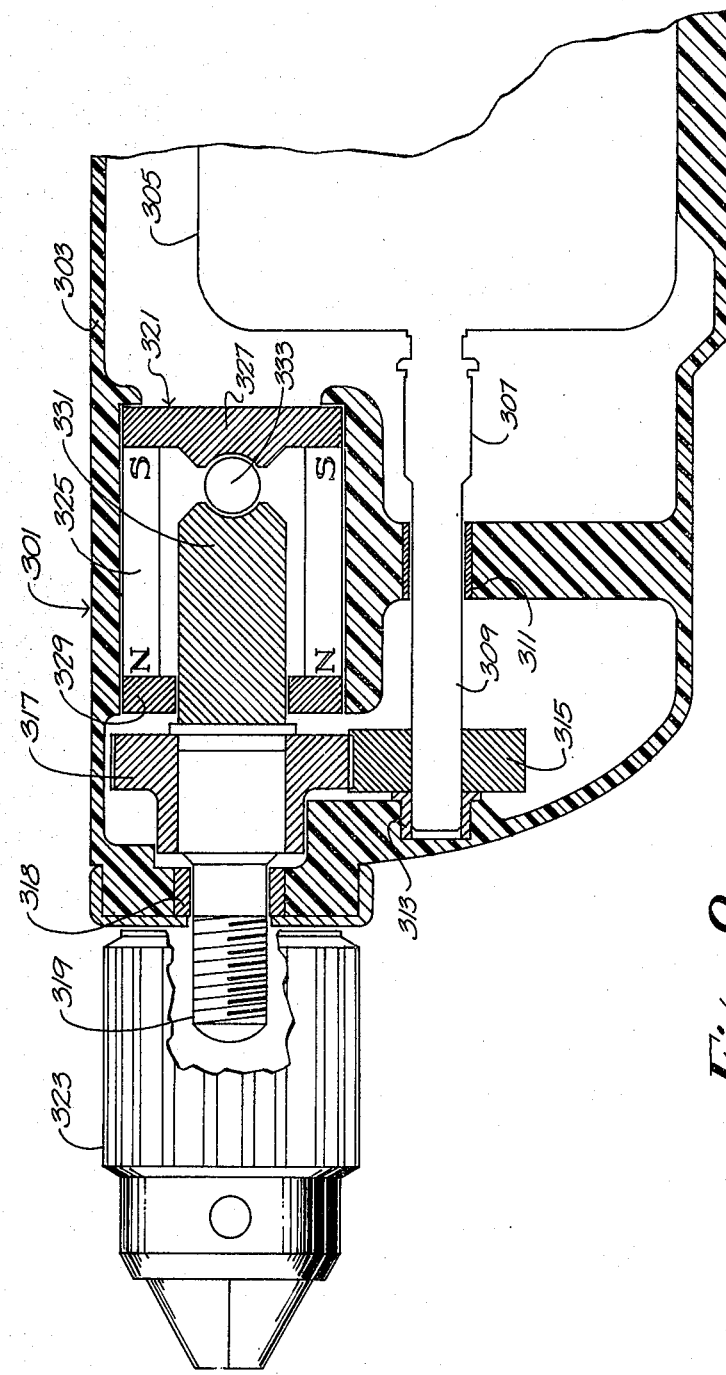
FIG. 9 is an elevational view partially in section of a power hand drill incorporating a thrust bearing according to the invention.

Referring now to FIG. 9 an electrically powered hand drill 301 is shown which includes a thrust bearing according to the present invention. Except for the thrust bearing the hand drill 301 of FIG. 9 is generally conventional and its other components are shown somewhat schematically and not in great detail. The drill includes a housing 303 containing a motor 305 having its shaft 307 coupled to pinion gear shaft 309.

Shaft 309 runs in sleeve bearings 311 and 313 and has pinion 315 secured thereto. Pinion 315 meshes with driven gear 317 mounted on drill shaft 319. Shaft 319 runs in a sleeve bearing 318 and the rear end thereof is retained in thrust bearing assembly 321. Drill chuck 323 is secured in a conventional manner at the front of drill shaft 319. A more complicated gear train with greater gear ratio could be employed without altering the manner of operation of the thrust bearing in the drill.

Thrust bearing assembly 321 includes a hollow cylindrical magnet 325, a rear pole piece 327, and annular front pole piece 329. These elements are all formed of ferro-magnetic material and while they are illustrated as separate elements it will be understood that the three elements could be formed of one unitary metal structure capable of being permanently magnetized. Also cylindrical magnet 325 could be replaced by two or more bar magnets arranged around shaft 319. The end portion 331 of shaft 319 is also of ferro-magnetic material and together with hard steel ball 333 completes a magnetic flux path in magnetic thrust bearing 321.

Pole piece 327 and the rear end of shaft portion 331 are provided with hemispherical indentations to accommodate ball 333, preferably with a radius of curvature slightly greater than ball 333. In a manner similar to that described for previous embodiments of the magnetic thrust bearing according to the invention, the magnetic flux due to the magnetomotive force of permanent magnet 325 flows through pole piece 327, ball 333 and the end portion 331 of shaft 319 and through pole piece 329. The air gap between pole piece 329 which is of annular shape and the end portion 331 of shaft 319 is quite small so that magnetic flux values may be quite large.

Accordingly, there is mutual attraction between shaft portion 331 and ball 333 and between ball 333 and pole piece 327. This eliminates the lost motion which would otherwise be present in thrust bearing assembly 321 and avoids the problems associated with such lost motion in attempting to accurately position drill bits or other tools on a work piece. If drill chuck 323 is forceably pulled forward it will cause the magnetic force between shaft portion 331 and pole piece 327 to be overcome but the motion of shaft 319 is limited to a small distance before shaft 319 and gear 317 interfere with bushing 318. Thus ball 333 remains captured between shaft portion 331 and pole piece 327 and the magnetic force of permanent magnet 325 will return the thrust bearing elements to the desired position whenever the forward force on chuck 323 is released.

It will therefore be seen that a thrust bearing for an electrically powered hand drill is provided by the magnetic thrust bearing of the present invention with very low friction and which in operation is without lost motion or play in a longitudinal direction.

Figure 10:
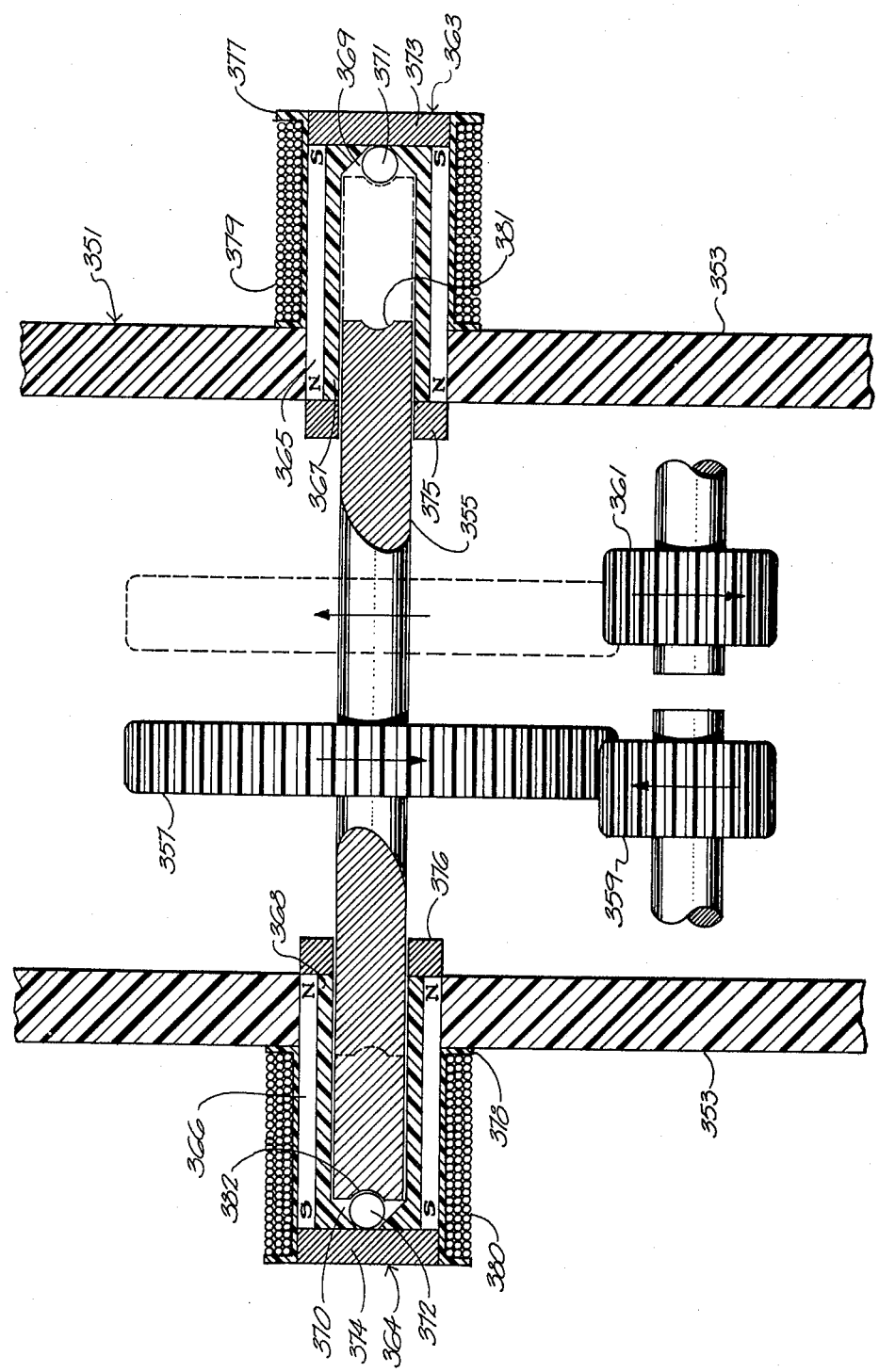
FIG. 10 is an elevational view partially in section of a gear shift mechanism incorporating a pair of magnetic thrust bearings according to the invention.

FIG. 10 shows gear shift apparatus incorporating an alternative form of magnetic thrust bearing according to the present invention. Gear shift apparatus 351 is illustrated as a reversing gear arrangement but it will be apparent to those skilled in the art that variable speed and torque gear shifting arrangements can equally well employ the thrust bearing apparatus of FIG. 10.

Gear shift apparatus 351 includes a frame 353 in which is mounted a slidable shaft 355 having a driven gear 357 secured thereto. Gear 357 is shown in solid lines in one of its alternative positions and in dashed lines in the other.

Gear 357 meshes with one or the other of pinion gears 359 or 361. Pinion gears 359 and 361 are mounted on separate shafts and are driven in opposite directions by mechanism not shown in FIG. 10. In accordance with conventional operation of reversing gear apparatus the gear 357 and shaft 355 rotates in opposite directions depending on which of the two gears 359 and 361 it is in mesh with. Further mechanism not shown is driven by the rotation of shaft 355 and gear 357. The mechanism thus far described is, of course, conventional.

A pair of thrust bearings 363 and 364 are provided at respective ends of shaft 355. Thrust bearings 363 and 364 face in opposite directions and are substantially identical in structure.

Shaft 355 is required to move laterally a predetermined distance to shift gear 357 from a position meshing with pinion gear 359 to the other position in which it meshes with gear 361. This will be referred to as the shift distance. Shaft 355 is shorter than the distance between seated positions in bearings 363 and 364 by the amount of the shift distance.

The thrust bearings 363 and 364 include a cylindrical magnet 365 and 366. Magnets 365 and 366 are separated from shaft 355 by non-magnetic liners 367 and 368 which have conical cavities 369 and 370 facing the ends of shaft 355.

These cavities contain balls 371 and 372 which when centered in conical cavities 369 and 370 are positioned to rest in depressions 381 and 382 in the ends of shaft 355.

The outer ends of the bearings are closed by pole pieces 373 and 374, and the inner ends are provided with annular pole pieces 375 and 376 which create an effective flux path from the North pole of their respective magnets 365 and 366 into the shaft 355, all of which are of ferro-magnetic material. As in previously explained embodiments of the apparatus the flux path also passes from an end of shaft 355 through steel ball 371 or 372 and pole piece 373 or 374 to the South pole of magnet 365 or 366.

The apparatus of FIG. 10 differs from previous embodiments in that there are oppositely disposed thrust bearings and the magnetic forces thereof are directed in opposite directions. Since the forces are stronger when shaft 355 is inserted a greater distance into one of the thrust bearings, the shaft will be "latched" into whichever of the bearings the shaft is thrust. The latching effect of the thrust bearings 363 and 364 could be utilized with manual or pneumatic means for shifting the shaft 355. However, it is very convenient to provide electromagnetic means for shifting the shaft 355 which operates in conjunction with magnetic thrust bearings 363 and 364. Accordingly, the apparatus of FIG. 10 includes solenoid electromagnets 379 and 380 wound on spools 377 and 378 so that the magnetic flux of solenoids 379 and 380 either aids or counteracts the flux of magnets 365 and 366. The electrical connections (not shown) to solenoids 379 and 380 are such that a direct current may be provided through the solenoids either in parallel or in series such that solenoid 379 produces a flux in aid of magnet 365 while solenoid 380 provides a flux counteracting the flux of magnet 366. Current in the opposite direction of course produces the opposite effect. Consequently supplying a direct current of one polarity of the solenoids 379 and 380 causes the magnetic attraction of magnet 365 to be nullified while magnet 366 and solenoid 380 attract shaft 355 to the left as shown in FIG. 10. A direct current of opposite polarity will produce the opposite effect causing the shaft to be shifted to the position shown in dashed lines in FIG. 10. The current applied to shift the shaft 355 may be terminated after a short period of time on the order of a second or less once the shaft has been shifted in position because the permanent magnets will thereafter retain it in position. In fact the shaft need only be shifted over center by the effect of the solenoids 379 and 380 and the permanent magnet in the bearing to which the shaft end is closest will attract shaft 355 more forcibly than its opposite number and complete the shifting motion of shaft 355. It will therefore be seen that a highly effective gear shifting mechanism is provided utilizing the magnetic thrust bearings of the present invention in an opposed pair on ends of a shaft in the mechanism and that the shifting force can very conveniently be provided by solenoid electromagnets operating in conjunction with the permanent magnets in the magnetic thrust bearings.

As previously mentioned a magnetic ball thrust bearing according to the invention has the additional advantage that with suitable modifications it is possible to dispense with the ball separator ring or ball cage. Such modifications will, on occasion, be referred to as a magnetic ball cage. A bearing in which the physical ball cage is eliminated is illustrated in FIGS. 11 and 12 showing an anemometer 761 incorporating such a bearing.

The anemometer has a rotor 763 on which are mounted three arms 765 carrying vanes 767. Arms 765 are secured to rotor 763 by threaded ends 769 in tapped holes in rotor 763. Nuts 775 lock arms 765 to rotor 763. Each vane 767 is secured to its arms 765 by rivets 777 passing through a clamping disc 779.

Figure 12:
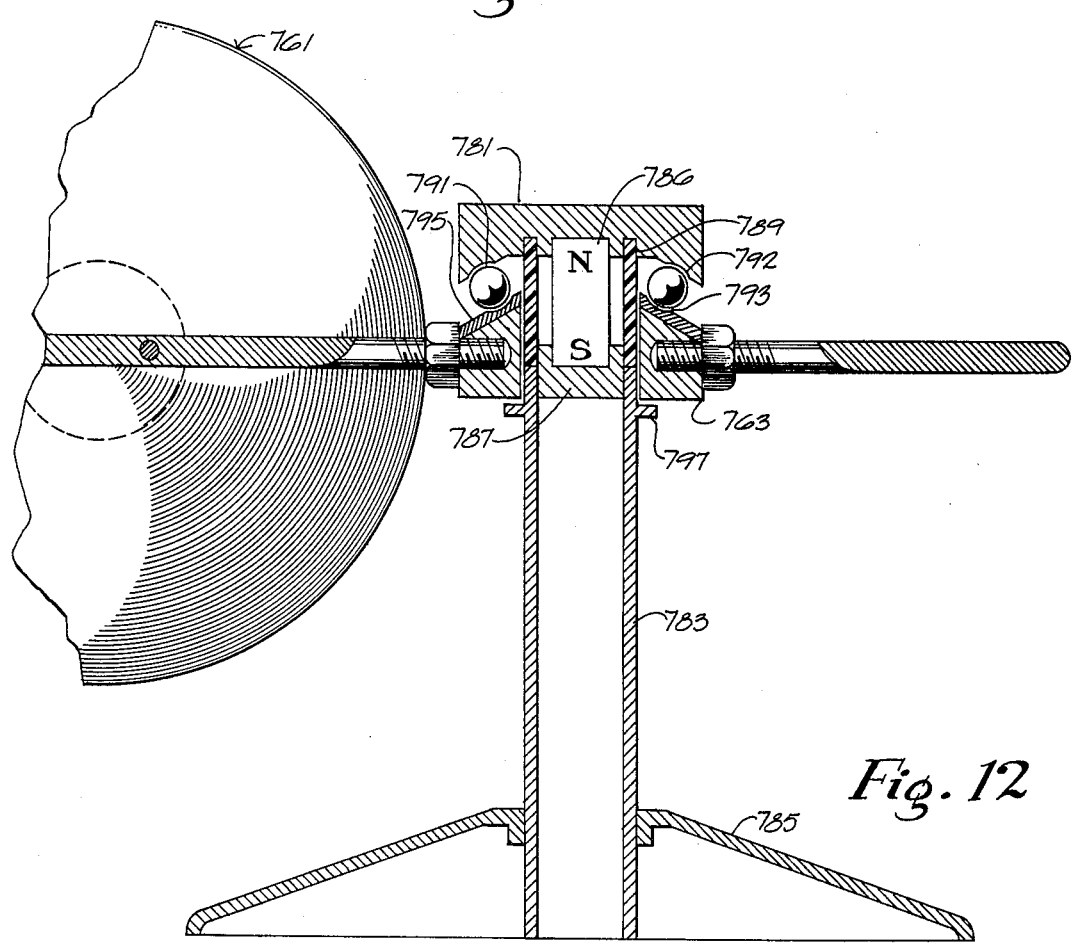
FIG. 12 is a vertical sectional view taken along the line 12—12 in FIG. 11.

As seen in FIG. 12 rotor 763 is supported by magnetic attraction to a stator 781 mounted on hollow tube 783 supported by base 785. Stator 781 acts as a pole piece for magnet 786. The other pole piece for magnet 786 is provided by a cylinder 787 of ferro-magnetic material. The lower portion of tube 783 preferably is also of ferro-magnetic material. The upper portion 789 of tube 783 is preferably plastic or other non-magnetic material. A plurality of steel balls 791 are captured between stator 781 and rotor 763 in races 792 and 793. Rotor 763 is for the most part made of ferro-magnetic material but the top surface of race 793 comprises a frustro-conical disc 795 of non-magnetic material, preferably a metal such as non-magnetic stainless steel alloy. A capture ring 797 assures that rotor 763 does not separate from stator 781. The structure of anemometer 761 and its operation are generally similar to that of anemometer 161 in FIGS. 4 and 5 except as to the distinctive magnetic ball cage feature of anemometer 761.

Figure 11:
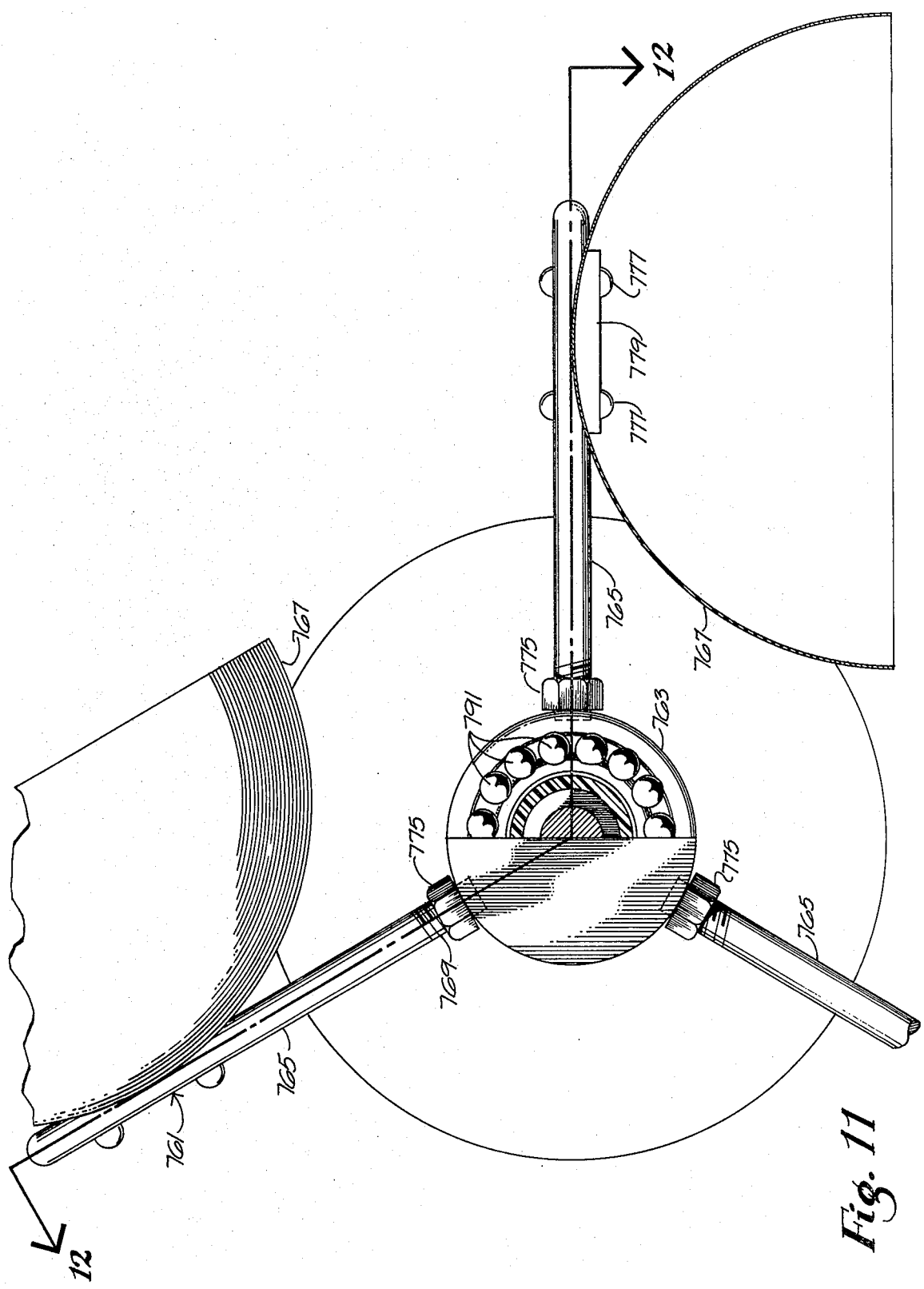
FIG. 11 is a top plan view, partially in section of an anemometer with a further embodiment of the invention.

As seen in FIG. 11 the large number of balls provided (fifteen) reduces the spacing between balls to a fraction of their radii. Also the inclusion of the non-magnetic disc 795 produces a gap between each ball 791 and the ferro-magnetic material of the rotor 763. This produces the effect of a North pole at the bottom of each ball in race 793 and diverging lines of magnetic force extend from the ball through stainless steel disc 795 to the ferro-magnetic material of rotor 763. Each North pole of a ball 791 repels the North pole of an adjacent ball with the effect that there is a significant mutual magnetic repulsion between the balls 791 serving as a magnetic ball cage.

Some eddy current damping effect is expected due to rotation of balls 792 in the magnetic field, and calibration of the anemometer will include the effect of eddy currents. However, such effects will be insignificant at very low velocities and will not prevent response to low wind velocities.

Figure 13:
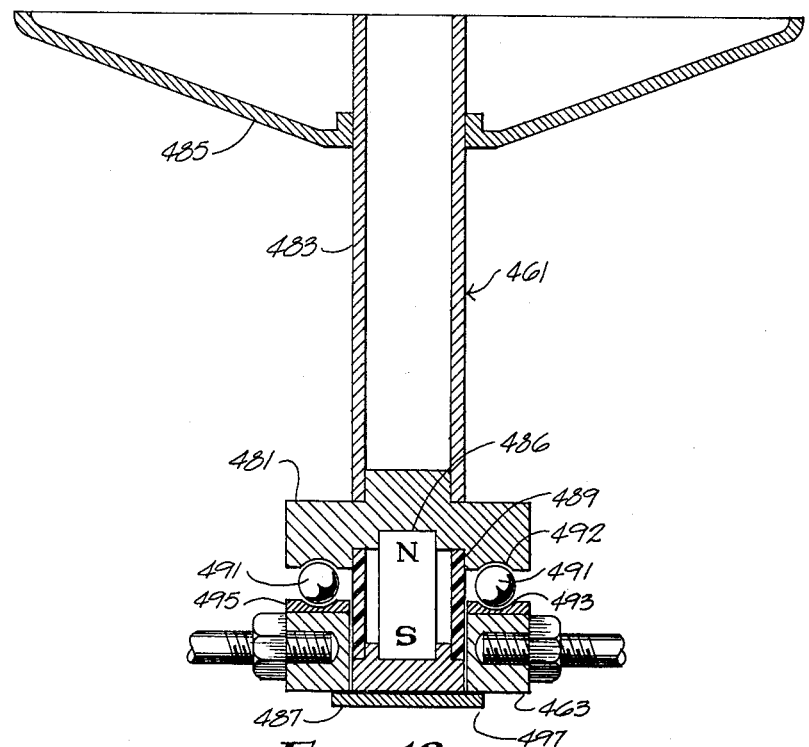
FIG. 13 is a fragmentary elevational view partially in section of an anemometer with yet a further embodiment of the invention.

Another embodiment of apparatus incorporating a bearing with the magnetic ball cage feature is shown in FIG. 13. The anemometer 461 shown therein is similar to that shown in FIGS. 11 and 12 except that it has horizontal ball races rather than tilted ball races and is supported from above rather than from below. It therefore will be described in less detail it being understood that as to details omitted the construction and operation is the same as anemometer 761 in FIGS. 11 and 12.

Anemometer 461 of FIG. 13 includes a support fixture 485, a support tube 483, a stator 481, and a rotor 463. The arms and vanes for the FIG. 13 embodiment may be identical to the FIG. 12 embodiment except for being four in number and hence oppositely disposed.

A magnet 486 is secured to stator 481 which also acts as a pole piece. Another pole piece 487 is secured to the bottom of magnet 486. Pole piece 487 is secured to stator 481 by tubing section 489 of non-magnetic material. Stator 481 and pole piece 487 are formed of ferromagnetic material.

Balls 491 run in races 492 and 493. Rotor 463 is made of ferro-magnetic material except for an annular disc 495 comprising its top portion and in which race 493 is formed. Disc 495 is preferably a metal such as non-magnetic stainless steel alloy. The number of balls in the bearing of FIG. 13 is larger than in a conventional ball bearing (for example 16). Therefore as in FIGS. 11 and 12 the spacing between balls is a fraction of their radii.

A capture plate 497 prevents complete separation of rotor 463 from stator 481. Clearance between plate 497 and rotor 463 may be very small as shown in FIG. 13 or may be substantially greater (from 1/64th to ⅛th of an inch). The FIG. 13 arrangement differs from that shown in FIGS. 11 and 12 by reason of the flat races 492 and 493 for balls 491 in contrast to the sloped races 792 and 793 shown in FIG. 12. The FIG. 13 arrangement therefore may be somewhat less adapted to withstand lateral forces. In general the operation of the apparatus of FIG. 13 is similar to that described in connection with FIGS. 11 and 12 and thus its operation will not be explained in further detail.

It should be noted that in bearings such as illustrated in FIGS. 11, 12 and 13 with the magnetic ball cage feature, the magnetic field supplied by the permanent magnet serves an additional distinct purpose as compared with the other embodiments. Accordingly, the magnetic ball cage feature is also applicable to radial bearings as well as thrust bearings. For example, if the sloped races 792 and 793 of FIG. 12 are increased in slope until they reach the extreme vertical position the bearing has been converted into a purely radial bearing with race 793 becoming inner race and race 792 becoming the outer race. It is apparent that in such an arrangement although the magnetic flux would pass through balls 791 in a generally horizontal direction, the magnetic ball cage feature would be present essentially as it is in FIG. 12.

From the foregoing description it will be apparent that magnetic ball thrust bearing with numerous variations are disclosed for a number of different applications. The bearings disclosed however are of quite general applicability and suitable for many applications other than those suggested. As mentioned, the principles of the invention are applicable to roller bearings and pivot bearings as well and numerous variations to the bearing structure will be apparent to those skilled in the art in addition to those specifically shown, described or suggested. Accordingly, the scope of the invention is not to be considered as limited to the particular embodiments suggested, but is rather to be determined by reference to the appended claims.

What is claimed is:

1. An anti friction bearing comprising
    a first bearing member,
    a second bearing member spaced from said first bearing member with a hard surface facing that of said first bearing member,
    at least one rolling element positioned between saiid bearing members in contact with surfaces thereof,
    means for partially restraining the motion of said rolling element, said at least one rolling element being a plurality of balls and said means for partially restraining the motion of said element including a race in the form of a circle in each of said bearing elements,
    a magnetic flux source with two magnetic poles positioned to produce a magnetic flux through said rolling element and at least a portion of said bearing members,
    means for conducting magnetic flux from one of said bearing members to the more distant pole of said magnetic flux source to provide an external flux path between the poles of said source, and
    a stop member secured in a fixed position relative to said first bearing member and positioned to limit the separation of the second bearing member from the first bearing member and to be spaced from said second bearing member when said rolling element is in contact with the surfaces of both of said bearing members,
    whereby there is an attractive force tending to hold said bearing members together with said rolling element therebetween, and said force holding said bearing members in contact with said rolling element is due solely to the magnetic force of said magnetic flux source.

2. Apparatus as recited in claim 1 wherein the line joining the normal points of contact of a ball with said races is perpendicular to the plane of each said circle.

3. Apparatus as recited in claim 1 wherein the line joining the normal points of contact of a ball with said races is nonperpendicular to the plane of each said circle.

4. Apparatus as recited in claim 1 wherein the line joining the normal points of contact of a ball with said races is oblique to the plane of each said circle.

5. Apparatus as recited in claim 1, 2, 3, or 4 wherein there are at least three of said rolling elements of the same radius and, when equally spaced, said rolling elements are spaced apart by a center-to-center distance less than three times their radius.

6. Apparatus as recited in claim 1, 2, 3 or 4, wherein a surface portion of said second bearing member is of nonferrous material.

7. An anti friction bearing comprising
    a first bearing member of ferrous material with a hard surface,
    a second bearing member with a hard surface spaced from said first bearing member with its said hard surface facing that of said first bearing member,
    at least one rolling element positioned between said bearing members in contact with said hard surfaces thereof,
    means for partially restraining the motion of said rolling element,
    a magnetic flux source with two magnetic poles positioned to produce a magnetic flux through said rolling element and at least a portion of said bearing members, and
    means for conducting magnetic flux from one of said bearing members to the more distant pole of said magnetic flux source to complete a substantially closed external flux path between the poles of said source,
    said second bearing member having at least limited mechanically unconstrained freedom of movement toward and away from said first bearing member,
    whereby the force to hold said bearing members in position in contact with said rolling element is provided by said magnetic flux source.

8. Apparatus as recited in claim 7 further including a stop member secured in a fixed position relative to said first bearing member and positioned to limit the separation of the second bearing member from the first bearing member.

9. Apparatus as recited in claim 7 wherein said at least one rolling element is a plurality of balls and said means for partially restraining the motion of said element includes a pair of races, one in the hard surface of each of said bearing elements, said races defining a constrained path for said balls in the form of a circle.

10. Apparatus as recited in claim 9 wherein the line joining the normal points of contact of a ball with said races is nonperpendicular to the plane of said circle.

11. Apparatus as recited in claim 9 wherein the line joining the normal points of contact of a ball with said races is oblique to the plane of said circle.

12. Apparatus as recited in claim 9, 10, or 11 wherein there are at least three of said rolling elements of the same radius and, when equally spaced, said rolling elements are spaced apart by a center-to-center distance less than three times their radius.

13. Apparatus as recited in claim 7, 8, 9, 10, or 11 wherein a surface portion of said second bearing member is of non-ferrous material.

14. An anti friction bearing comprising
    a first bearing member having a depression therein with a hard surface,
    a second bearing member having a projection thereon with a hard surface spaced from said first bearing member with said projection extending into said depression,
    a magnetic flux source with two poles positioned to produce a magnetic flux through said projection and portions of said bearing members, and
    means for conducting magnetic flux from one of said bearing members to the more distant pole of said magnetic flux source to complete a substantially closed external flux path between the poles of said source,
    whereby there is an attractive force tending to hold said bearing members together.

15. Apparatus as recited in claim 14 wherein said projection is a sharp pivot.

16. An anti friction bearing comprising
    a first bearing member with a hard surface,
    a second bearing member spaced from said first bearing member with a hard surface facing that of said first bearing member,
    at least one rolling element positioned between said bearing members in contact with surfaces thereof,
    means for partially restraining the motion of said rolling element, a magnetic flux source with two magnetic poles positioned to produce a magnetic flux through said rolling element and at least a portion of said bearing members, and means for conducting magnetic flux from one of said bearing members to the more distant pole of said magnetic flux source to provide an external flux path between the poles of said source, said second bearing member having at least limited mechanically unconstrained freedom of movement toward and away from said first bearing member, whereby the force to hold said bearing members in position in contact with said rolling element is provided by said magnetic flux source.

17. An anti friction bearing comprising a first bearing member with a hard surface, a second bearing member spaced from said first bearing member with a hard surface facing that of said first bearing member, a plurality of balls positioned between said bearing members in contact with the surfaces thereof, means for partially restraining the motion of said plurality of balls including a race in the form of a circle in each of said bearing elements, the line joining the normal points of contact of a ball with said races being perpendicular to the plane of each said circle, a magnetic flux source with two magnetic poles positioned to produce a magnetic flux through said plurality of balls and at least a portion of said bearing members, and means for conducting magnetic flux from one of said bearing members to the more distant pole of said magnetic flux source to provide an external flux path between the poles of said source, whereby there is an attractive force tending to hold said bearing members together with said plurality of balls between.

18. Apparatus as recited in claim 17 wherein said plurality of balls includes at least three balls of the same radius and, when equally spaced, said balls are spaced apart by a center-to-center distance less than three times their radius.

19. Apparatus as recited in claim 17 or 18 wherein a surface portion of said second bearing member is of non-ferrous material.

20. An anti friction bearing comprising a first bearing member of ferrous material with a hard surface, a second bearing member with a hard surface spaced from said first bearing member with its said hard surface facing that of said first bearing member, a plurality of balls positioned between said bearing members in contact with said hard surfaces thereof, means for partially restraining the motion of said plurality of balls including a pair of races, one on the hard surface of each of said bearing elements, said races defining a constrained path for said balls in the form of a circle, the line joining the normal points of contact of a ball with said races being perpendicular to the plane of said circle, a magnetic flux source with two magnetic poles positioned to produce a magnetic flux through said plurality of balls and at least a portion of said bearing members, and means for conducting magnetic flux from one of said bearing members to the more distant pole of said magnetic source to complete a substantially closed external flux path between the poles of said source.

21. Apparatus as recited in claim 20 wherein said plurality of balls includes at least three balls of the same radius and, when equally spaced, said balls are spaced apart by a center-to-center distance less than three times their radius.

* * * * *